(12) United States Patent
Giberson (10) Patent No.: US 6,712,516 B1
(45) Date of Patent: Mar. 30, 2004

(54) BEARING SPRING PLATE PEDESTAL (76) Inventor: Melbourne F. Giberson, 30 Ludwig's Crossing La., Glenmoore, PA (US) 19343

( * ) Notice: Subject to any disclaimer, the term of this patent is extended or adjusted under 35 U.S.C. 154(b) by 0 days.

(21) Appl. No.: 10/172,899

(22) Filed: Jun. 17, 2002

(51) Int. Cl.[7] .............................................. F16C 27/02
(52) U.S. Cl. ...................... 384/215; 384/535; 384/581
(58) Field of Search ................................. 384/215, 526, 384/581, 439, 428, 441, 535

(56) References Cited

U.S. PATENT DOCUMENTS 4,564,300 A * 1/1986 Schulze ..................... 384/581
6,062,364 A * 5/2000 Kajitani et al. .......... 192/70.16

* cited by examiner

Primary Examiner—Lenard A Footland
(74) Attorney, Agent, or Firm—Polster, Lieder, Woodruff & Lucchesi, L.C.

(57) ABSTRACT

Existing bearing spring plates for a certain class of steam turbines fail due to a combination of static stresses and cyclic stresses over a long period of time leaving the bearings unsupported. The failures typically occur at welds between the flexible support plate and the pedestal base plate. A method to replace the broken spring plate to return the steam turbine to service is provided. A replacement bearing spring plate pedestal has a flexible plate integral with top and bottom mounting blocks. The flexible spring plate and mounting blocks meet at large radii, polished and substantially free from stress risers. A drill fixture permits drilling and tapping holes in the pedestal base plate to install the replacement spring plate pedestal at the proper location. The bottom block is secured as by bolting with epoxy to a pedestal base plate, and a top block is bolted onto a bearing-supported yoke. The flexible spring plate and top and bottom blocks are made from a continuous forging of alloy steel, heat treated. Preferably, a tapered shim plate is used to obtain the proper tilt of the bearing to match the turbine shaft tilt in order to minimize flexing of the flexible spring support plates.

7 Claims, 5 Drawing Sheets

BEARING SPRING PLATE PEDESTAL

CROSS REFERENCE TO RELATED APPLICATIONS

STATEMENT REGARDING FEDERALLY SPONSORED RESEARCH OR DEVELOPMENT

Not Applicable

BACKGROUND OF THE INVENTION

This invention has particular application to the replacement of flexible bearing supports of a type used in Westinghouse Electric Company steam turbines from the late 1940s to the mid 1960s, but its utility is not confined thereto. Such turbines and their associated generators are massive, and expensive, and interruption of their use is of grave importance. They usually have two units, a high pressure turbine and a low pressure turbine, connected, with bearings in which aligned shafts of the two turbines are journalled. The bearings are supported by flexible plates, which, after some length of time, have been liable to break leaving the bearings unsupported, resulting in damage to the bearings and the turbines themselves. For reference, in this type of steam turbine, the bearing design is typically steel backed, babbitt lined, oil film lubricated, and not of rolling element design.

In this type of bearing support pairs of flexible support plates, one on either side of the shaft being supported, are connected at their upper ends to arms of a yoke extending transversely of the shaft. The yoke is symmetrical, and the support plate assemblies are mirror images of one another. In prior art assemblies the flexible support plates extend between a floor plate and an upper block, the floor plate being mounted on a sole plate, which is in turn mounted onto a foundation. The upper block is connected to the bearing-supporting yoke. The flexible support plates, sometimes referred to hereinafter as flex plates, are rectangular, with flat, parallel sides, and at their top and bottom edges, fit into channels in the top block and floor plates. The channels have chamfered sides, and the flexible support plates are welded along their opposite sides in the channels. Over a period of years, a combination of static stresses and a large number of cyclic stresses causes the flexible support plates to break at or near the joint with the pedestal base. When either the bottom joint or the top block joint fails, the bearing function is lost and there is much damage to the turbine.

An object of this invention is to provide a bearing spring plate pedestal that obviates the problem of breakage. As has been pointed out, it has particular application to the replacement of bearing supports that have failed or are likely to fail, and to the method of their replacement, although its utility is not confined thereto.

BRIEF SUMMARY OF THE INVENTION

In accordance with this invention, generally stated, a bearing spring plate pedestal is provided which comprises a flexible plate integral, that is, of one piece, with top and bottom mounting blocks, the flexible plate and mounting blocks meeting at large radii, polished and substantially free from stress risers. The terms "radius" and "radii" as applied to the invention, are used herein to include any arcuate transition area with a smooth, continuous curve spanning 90 degrees from the flexible plate to a top or bottom block, not just a circular cylindrical arc. The flexible plate and top and bottom block are made from a continuous forging of alloy steel, heat treated. Preferably, a tapered shim is positioned between a top mounting block and the bearing-supporting yoke to permit accommodation for tilting of the bearing. In the illustrative embodiment shown and described, two pairs of sets of bearing plates are shown, supporting shafts journalled in bearings supporting aligned and connected shafts of a high pressure turbine and a low pressure turbine. The bearing plates of each set are mirror images of one another, and except as noted, the two bearing supports illustrated are mirror images of one another. Single bearings are supported with the same apparatus, and the description of one of the flexible plates of this invention and its installation is equally as applicable to the single pair of a set of mirror image supports of a single bearing as to the mirror image supports of the two bearing arrangement of the preferred embodiments.

In the method of replacing a failed bearing flexible support plate, there are three preferred methods. In the first, any protruding part of the failed plate is machined, as by milling or grinding off with a portable milling machine or grinder, both methods being encompassed by the term "machined" as used herein, and that part and the top surface of the pedestal base surrounding it are machined so that they are flat, and this top surface now becomes the mating surface to the replacement flexible pedestal support.

A drill fixture, with holes in exact correspondence with holes in the bottom block is positioned over the exposed surface of the pedestal base in precisely the position to be assumed by the pairs of flexible plates, holes are drilled in the pedestal base in conformance with a hole pattern in the drill fixture that corresponds exactly with a hole pattern in the bottom block, and tapped. A common method of making the holes in a drill fixture is to make the diameters of the holes to be the diameters of the tap drills to be used to make the holes in the pedestal base, and not the diameters of the clearance holes of the bottom block of the bearing spring plate pedestal to be installed. If epoxy is used to help secure the bottom block of the flexible plate to the pedestal base and to fill any voids that might be found under the bottom block, it is applied before the hold-down bolts are torqued down, and then the bolts are tightened.

In a second method, any protruding broken flexible plate is machined down so that they protrude a short distance, as, for example, approximately ¼ inch, but are not completely eliminated. The surface area around the protruding broken flexible plate or plates, is machined flat, preferably leaving a narrow strip, for example, about ¼the of an inch per side, of unmachined surface around the protruding flexible plate stub or stubs, contiguous the protruding flex plate stub. A groove sufficiently deep to accommodate the protruding broken flexible plate stub, and wide enough to bridge the distance beyond the unmachined strips is machined into the bottom surface of the lower block A similar groove is machined into the undersurface of each plate of the drill fixture. Epoxy can be used to form a permanent chock in the gaps around the remains of the protruding flexible plates, and any other gaps between the bottoms of each of the flexible support structures and the tops of the mating sections of the pedestal base. The use of the drill fixture is common to all the methods in the preferred embodiments.

The third method, is to grind the broken and protruding remains of the original flexible plates, and to leave them protruding for a short distance, as, for example, ¼ of an inch, and not to machine the base plate flat. The drill fixture, with grooves in the bottom, is used as in the prior two methods, but the two sides of the drill fixture are not expected to sit flatly on the top surfaces of the pedestal base. The fixture is fastened by a block or shim or otherwise so that it remains properly located with enough rigidity to function properly. The drill fixture as in the other two cases is used to locate and drill the hold-down bolt holes. In this method, shims or small jack bolts are expected to be required to level and hold in position the replacement flexible support structures. In this case, epoxy is used to form a permanent chock in the gaps around the remains of the protruding flex plates and other gaps between the bottom of each of the flexible support structures and the top of the mating section of the pedestal base. Once the flexible support structures are properly bolted in place and the epoxy is suitably cured, then the assembly of the remainder of the bearing support structure, bearing and turbine rotor is as first described above.

Preferably, at least the rotor of the turbine the bearing support for which is being replaced is removed and the old pedestal equipment is removed, leaving the broken surface of the flexible support plate or plates exposed, so that the projecting part of the broken flexible plate and an area around it can be machined. Of course, both rotors can be removed, but it has been found sufficient to remove only the one turbine rotor. After the parts are machined, the new flexible supports are set in place. Trial shim plates are installed, the yoke is installed, and the lower half of the bearing is installed. A stub shaft is mounted on the end of the remaining turbine rotor coupling hub, so as to duplicate approximately where the journal for the bearing adjacent the turbine will be located when the removed turbine shaft is repositioned. The upper half of the bearing and the bearing cover are installed. The bearing yoke can be moved around so that the bearing is aligned to the stub shaft. When aligned, the bearing and yoke will be in almost identical positions to that which will be required when the normal turbine rotor is installed. The hold down bolts are now positioned and tightened to hold the flexible supports in place, and shim plates made and installed to obtain the proper tilt to minimize flexing of the flexible support plates. If it is desired to install the pedestal with epoxy to secure the support flexible pedestals to the pedestal base, this can be done at the time the bolts are put in.

After the hold down bolts are installed completely and alignment is verified, then the bearing cover, bearing upper half and stub shaft are removed. Holes through the top block are provided so that an extension rod and proper tool can be used to torque certain bolts through the bottom block that are otherwise hard to torque to the specified values. If epoxy has been used, after the epoxy has hardened, the shim plates, yoke and bearing lower half can be installed. The bearing pedestal and bearing are now ready for installing the removed turbine rotor.

BRIEF DESCRIPTION OF THE SEVERAL VIEWS OF THE DRAWINGS the drawings.

DETAILED DESCRIPTION OF PREFERED EMBODIMENT

Figures 1, 2:
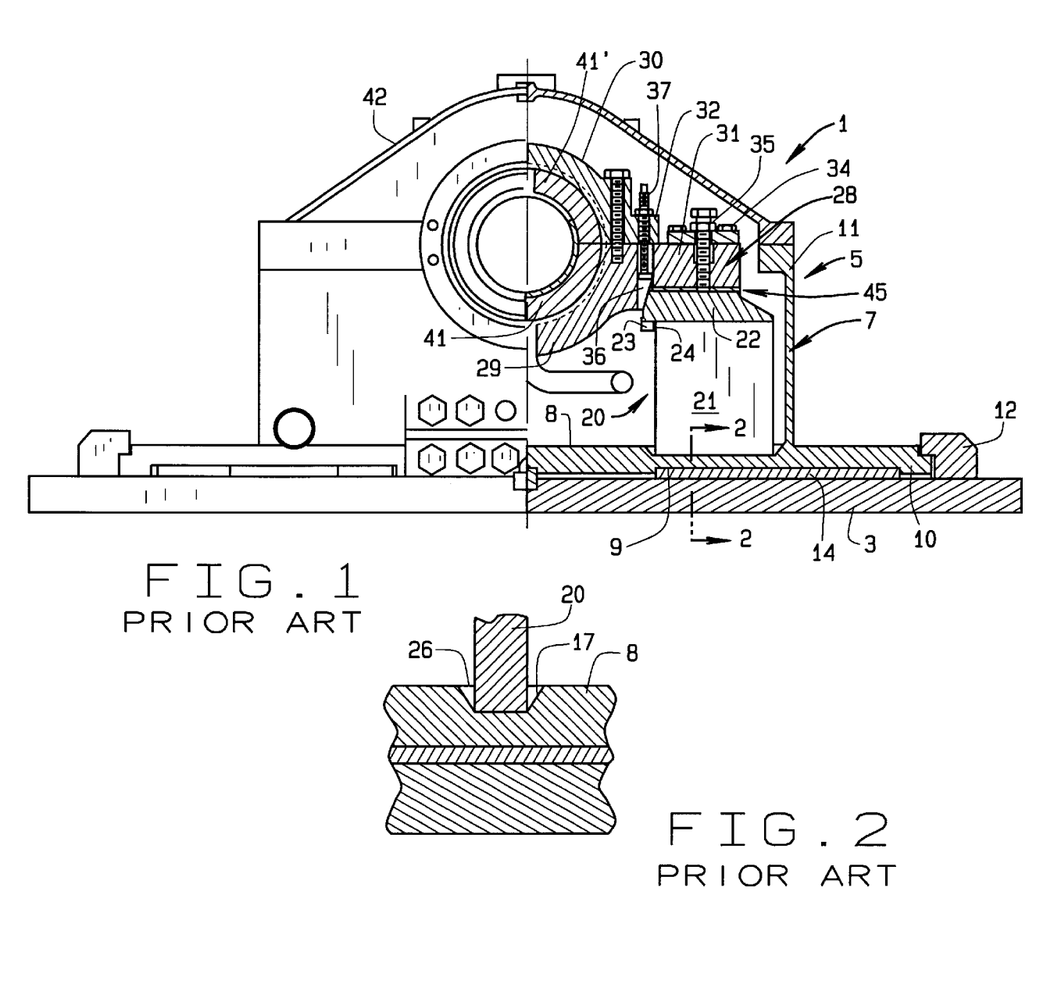
FIG. 1 is a view in front elevation, partly in section, of a prior art flexible plate bearing support.
FIG. 2 is a sectional view taken along the line 2—2 of FIG. 1.
Figure 3:
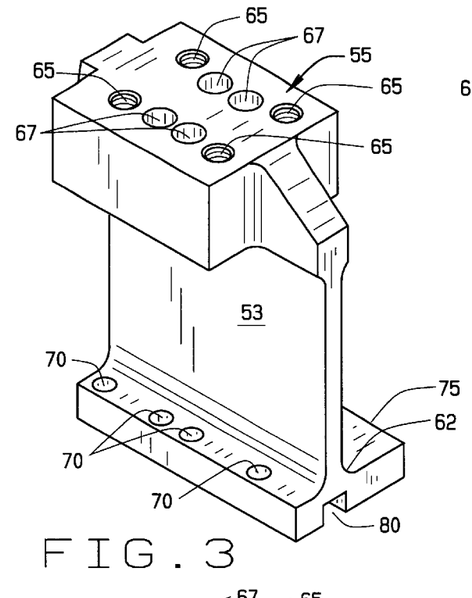
FIG. 3 is a view in perspective of one embodiment of flex plate of this invention.
Figure 4:
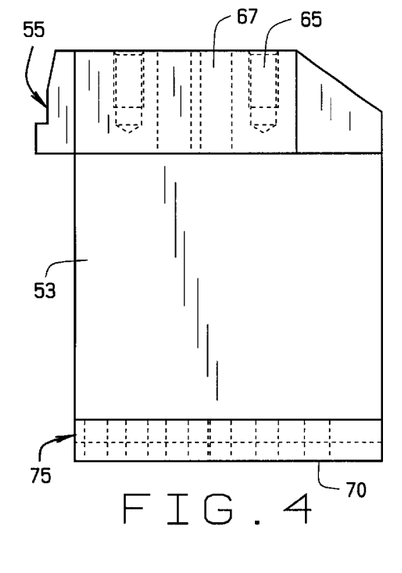
FIG. 4 is a view in side elevation of the flex plate of FIG. 3.
Figure 5:
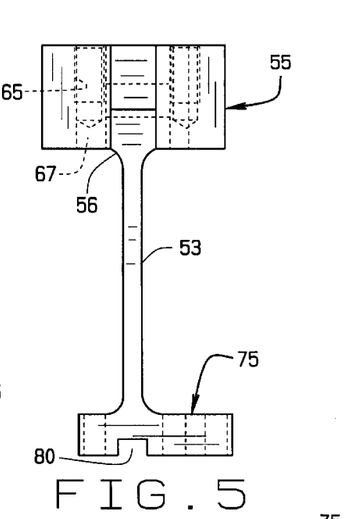
FIG. 5 is a view in end elevation of the plate of FIG. 3.
Figure 6:
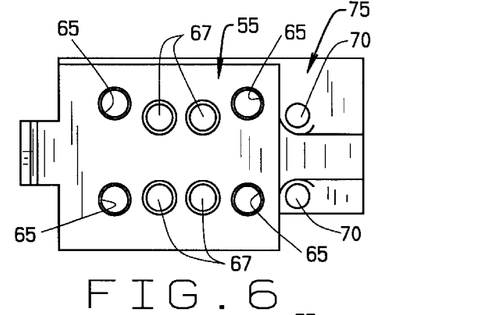
FIG. 6 is a top plan view.
Figure 7:
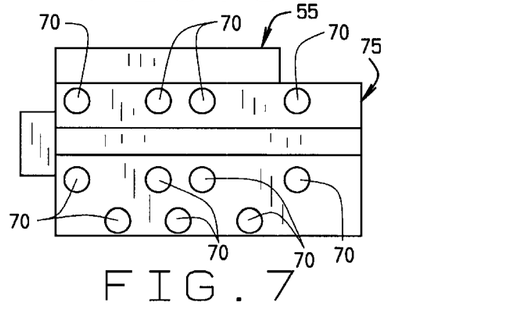
FIG. 7 is a bottom plan view.

Referring now to FIG. 1 for a prior art bearing pedestal assembly, the various elements, except for the flexible plate assembly, are identical in the prior art device and in the present device, the present invention lying in the replacement bearing spring plate pedestal or flexible plate assembly. The bearing pedestal assembly 1 includes a sole plate 3 mounted on a foundation, not here shown, a pedestal 5, a pedestal cover 42, a yoke 28 with a lower bearing cradle 29 and an upper bearing housing 30, a turbine shaft bearing comprising a lower bearing half 41 and an upper bearing half 41', and an upper bearing housing 30.

The pedestal 5 has a pedestal base 7, a pedestal base floor plate 8, in a lower surface of which is a channel 9, a bearing plate 14, mounted fixedly in the channel 9, a pedestal base floor plate flange 10 at each end of the floor plate, a pedestal base side wall 11, and side gibs 12, extending over the flange 10 with enough clearance in this embodiment to permit the pedestal assembly, including the bearing plate 14, to slide on sole plate 3 parallel to the axis of a turbine shaft. To this end, the floor plate on either side of the bearing plate 14 has clearance over the sole plate 3, so that the sliding surfaces are the underside of the bearing plate 14 and the upper surface of the sole plate. The construction and operation of the bearing spring plate of this invention is, however, independent of whether or not the pedestal assembly is movable or fixed.

The yoke 28 has arms 31 through which bolts 34 extend into a top block 22 of a flexible blade assembly 20 through holes in a shim pack 45 that embraces a jack screw 35. The yoke can be moved a short distance transversely by a screw 37 extending through a threaded hole in arm 32 of upper bearing housing 30, through a hole in arm 31 of yoke 28 into a wedge 36 between top block 22 of the flexible plate assembly 20 and an edge of the hole through the arm 31. There are two wedge assemblies in a yoke, symmetric with respect to the shaft centerline, to be able to move the yoke and attached bearing assembly to the left or right to achieve a desired rotor and bearing alignment, and to retain the alignment once set. Several variations of the wedge arrangement for aligning rotors and bearings have been used over the years, any of which wedge arrangements may be used with the present invention.

The prior art flexible plate assembly includes, besides the top block 22, a flexible plate 21. In the prior art device, a top edge of the blade 21 extends into a channel 23 in the underside of the top plate 22, where it is welded with a weld 24, and a bottom edge extends into a channel 17 in the upper surface of the floor plate 8 where it is secured by a weld 26 as shown in detail in FIG. 2. As has been indicated in the discussion above, this construction ultimately often leads to breakage of the flex plate 20 at the weld 26 or a short distance above the weld 26.

Figure 8:
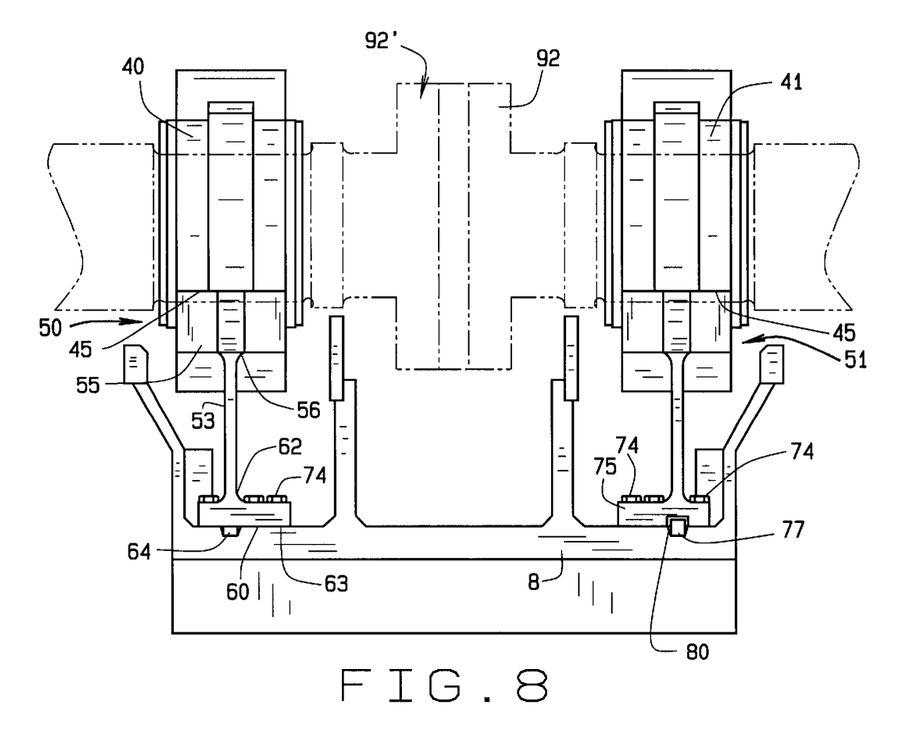
FIG. 8 is a view in side elevation of an installation, showing two embodiments of flex plate assembly of this invention.
Figure 9:
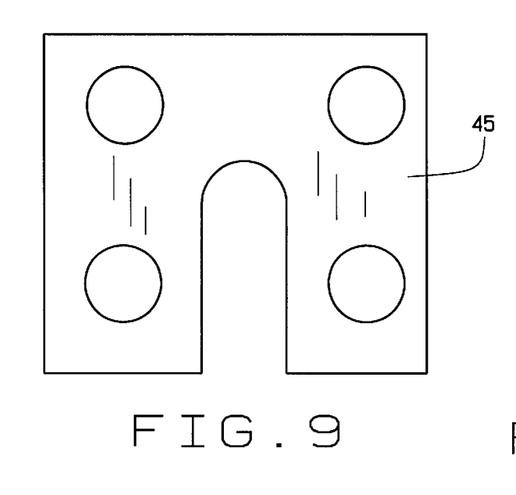
FIG. 9 is a top plan view of a shim plate for use in the assembly shown in FIG. 8.
Figure 10:
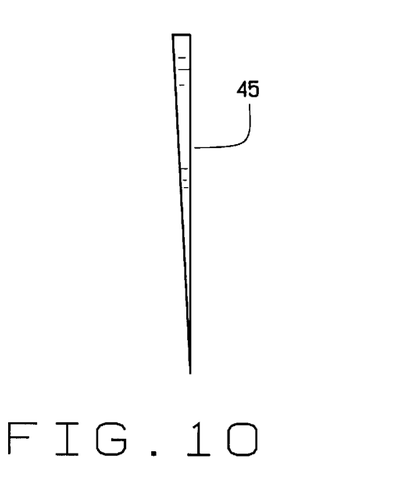
FIG. 10 is a view in side elevation of the shim plate of FIG. 9.

Referring now to FIGS. 3–8 for embodiments of the flexible plate assembly of this invention, reference numeral 50 indicates one embodiment shown on the left of FIG. 8 as supporting bearing 40 of a high pressure turbine shaft 92', and reference numeral 51 indicates a second embodiment, shown to the right of FIG. 8 as supporting a bearing 41 of a low pressure turbine shaft 92.

In the embodiment of flexible plate assembly 50, each of the pair of assemblies 50 is in one piece, a top block 55, a flex plate 53 and a bottom block 60 being made from a single continuous forging of alloy steel (comparable to AISI 4340, carbon alloy steel known for excellent endurance characteristics). Flexible plate 53 and the top block 55 meet at large radii 56. The flexible plate 53 and bottom block 60 meet in large radii 62. If, as is more or less standard, the flexible plate itself is ¾" thick, the radii, top and bottom and on each side, can be ¾". All the radii are polished through the radii and a short distance beyond to remove tool marks, eliminating these potential stress risers.

In the flexible plate assembly 50, a lower surface 63 of the bottom block 60 is uninterruptedly smooth. A stub 64 of a broken plate 20 is ground flush with a top surface of the floor plate 8, which is machined flat, if it is not already flat, so that the bottom block 60 rests flat against a flat surface.

Except for the provision of a channel 80 in the bottom surface of a bottom block 75, a flex plate assembly of a second embodiment 51, shown on the right hand side of FIG. 8, is identical with the flexible plate assembly 50 of the first embodiment, and the description of the top and bottom block, except for the channel 80, is identical in the two embodiments.

In both, threaded holes 65 in the top block receive bolts 34 through the yoke arm 31. Additional, unthreaded holes 67 are provided to give easy access to those of bolts 74 that are difficult to reach. Bolts 74 extend through bolt holes 70 in the bottom block and screw into tapped holes in the floor plate 8.

In the second embodiment 51, a broken plate stub 77 is machined to a distance, for example ¼ inch, above the upper surface of the floor plate 8, and the upper surface of the floor plate 8 is machined smooth to within a short distance, for example ¹⁄₁₆ of an inch, of the stub 77. The channel 80 is wide enough to span the stub 77 and the unmachined area immediately adjacent the stub, and deep enough to clear the stub 77.

In a third embodiment, not here illustrated, because it will look like the second embodiment, the area of the lower surface of the floor plate 8 is not machined, and the stub 77 is merely machined until its highest point is the desired height, for example ¼ inch.

Figure 11:
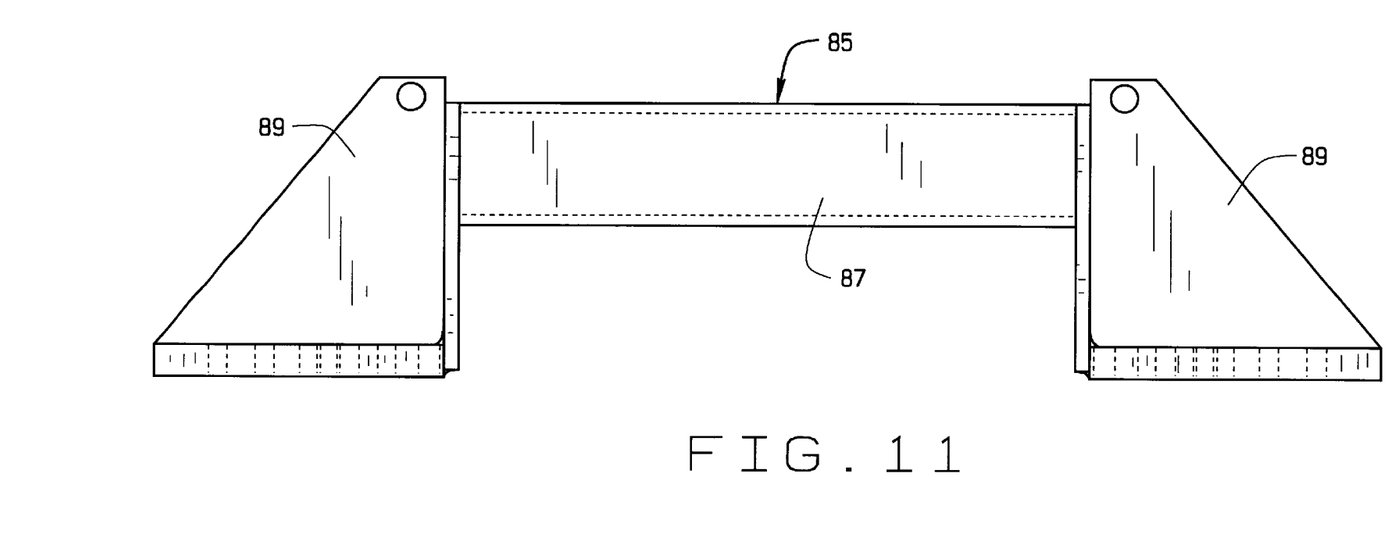
FIG. 11 is a view in side elevation of a drill fixture used in installing the flex plate assemblies in accordance with one method of this invention.
Figure 12:
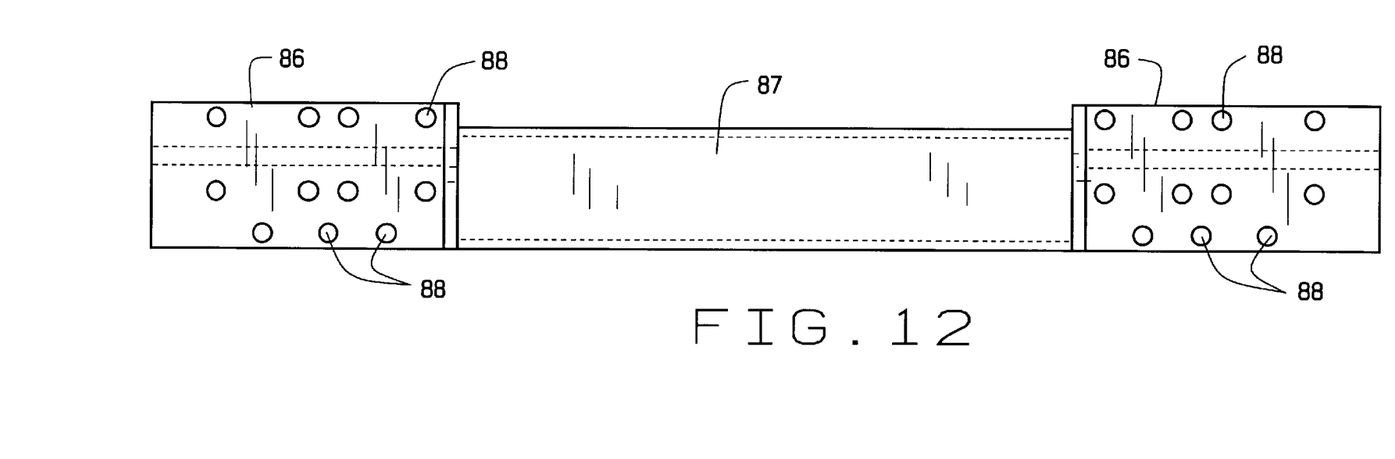
FIG. 12 is a bottom plan view of the drill fixture of FIG. 11.

In any of the embodiments, a drill fixture 85 is put into position with template plates 86 resting on the top surface of the floor plate 8 of each of the pair of flex plate assemblies in the places in which the flex plate assemblies are to be fastened. The template plates 86 are connected with a bridging piece 87 and gussets 89. The template plates have holes 88 in the exact pattern of boltholes 70 in the bottom blocks 75 and 60, holes 88 being sized to suit the tap drill for hold down bolts 74. Holes in the floor plate 8 are drilled, through the template plate holes, and tapped. In the floor plate of the sliding assembly, the tapped holes in the floor plate are less than 2 inches deep, but deep enough to insure that the block is fixed to the floor plate. The holes in the floor plate in that case cannot extend through the floor plate, because a bolt, protruding from them, would interfere with the movement of the assembly.

In installing the assembly of the first embodiment, if only one pair of flexible plates has to be replaced, the affected turbine rotor is removed from the turbine. The old pedestal equipment is removed, leaving the broken surface of the flexible support plate exposed. If only one of the flex plates of the pair is broken, the other of the pair is preferably cut off and replaced, although a single flex plate assembly can be replaced if desired. A portable milling machine can be mounted on the pedestal and used to machine the top surface of the pedestal base and a protruding flex plate so that the entire area is flat. The drill fixture 85 is then placed on the mating surfaces for the two flex plate assemblies.

Figure 13:
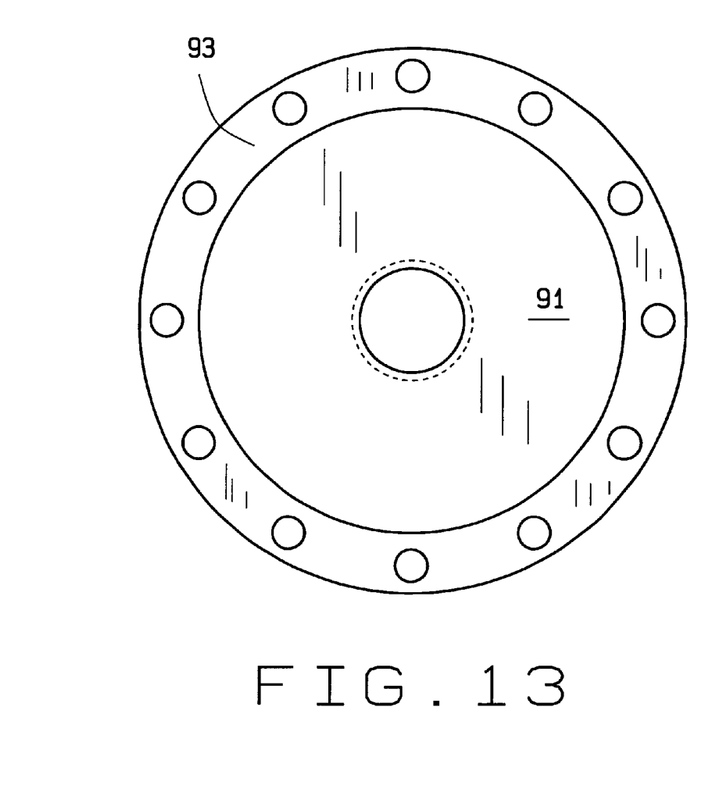
FIG. 13 is a view in end elevation of a stub shaft used in installing the flex plate assemblies in accordance with one method of this invention.
Figure 14:
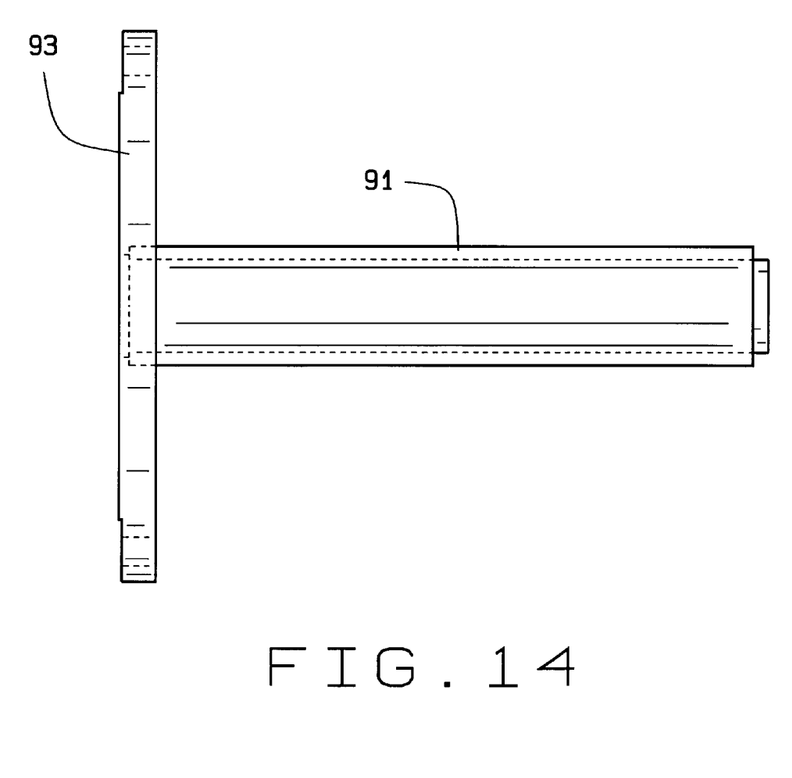
FIG. 14 is a view in side elevation of the stub shaft of FIG. 13.

The assembly boltholes are then drilled, the fixture is removed and the holes in the floor plate tapped. The flexible supports are then set in place. Trial shim plates are installed. The yoke is installed. The lower half of the bearing is installed. A stub shaft 91 with a hub 93, shown in FIGS. 13 and 14, is bolted to the end of the other turbine rotor coupling up so as to duplicate approximately where the journal for the bearing will be located when the removed turbine shaft is reinstalled.

The stub shaft in place, the upper half of the bearing and the bearing cover are installed. Now the bearing yoke can be moved around so that the bearing is aligned to the stub shaft. When aligned, the bearing and yoke will be in almost the identical position to that which will be required when the normal turbine rotor is installed. Hold down bolts can now be installed to hold the flexible supports in place and shim plates can be made and installed to obtain the proper tilt to minimize the flexing of the flexible support plates. If it is desired to install the pedestal with epoxy to act as a chock in any gap, however small, or to secure the support flexible pedestals to the pedestal base, this can be done at the time the bolts are installed.

After the hold down bolts to the pedestal base are installed completely, and alignment is verified, then the bearing upper half, and stub shaft, are removed. It is difficult to get a wrench on some of the bolts to the lower block The passages 67 in the top block are provided so that an extension rod and proper tools can be used to torque certain of the bolts that are otherwise hard to reach. After the epoxy is hardened, the shim plates, yoke, and bearing lower half can be installed. Bearing pedestal and bearing are now ready for installing the turbine rotor.

In preparing the top surface of the base for the second embodiment, the remaining flex plates are ground down so that they protrude approximately ¼ inch but are not completely eliminated. In the present example, the flex plates of each of the embodiments are approximately ¾ inch thick The surfaces around the protruding flex plate stubs are machined flat, but leaving approximately ¹⁄₁₆ inch per side around the protruding flex plate, or an unmachined band approximately ⅞ inch wide over each of the flex plates. The groove 80 in each of the bottom blocks is approximately 1 inch wide and of sufficient depth to clear the stubs so that when installed each new flexible support structure bridges the protruding remains of the original flex plate and the unmachined area on either side of the stub. The remainder of the installation is as described with respect to the first embodiment. The drill fixture in this case will also need to have a similar groove machined in the bottom surfaces of the template plate. In the case of the second method, epoxy is used to form a permanent chock in the gaps around the remains of the protruding flex plates, and in any other gaps between the bottoms of each of the flexible support structures and the tops of the mating sections of the pedestal base.

In preparing for the third embodiment, the broken and protruding remains of the original flex plates are again ground to a height of approximately ¼ inch, but the base plate or floor plate is left as is. This may be all that can be done in some situations. Then, the drill fixture with grooves in the bottom of each side is installed as in the prior two embodiments, but the two sides of the drill fixture are not expected to sit flatly on the top surfaces of the pedestal base. The drill fixture is fastened with a block or shim or otherwise so that it remains properly located with adequate rigidity to function properly. The drill fixture is then used as in the other two embodiments to locate and drill the hold down holes. Shims or small jack bolts are expected to be required to level into position the replacement flexible support structures. In this case, epoxy is used to form a permanent chock in the gaps around the remains of protruding flex plates and other gaps between the flexible support structures and the top of the mating section of the pedestal base. Once the flexible support structures are property bolted in place and the epoxy is suitably cured, the assembly of the remaining bearing support structure, bearing and turbine rotor is as first described above.

Numerous variations in the construction of the device of this invention and the method of its installation, within the scope of the appended claims, will occur to those (extra period) skilled in the art in light of the foregoing disclosure.

What is claimed is:

1. A bearing spring plate pedestal comprising a flexible plate integral with top and bottom mounting blocks, said flexible plate and mounting blocks meeting at an arcuate transition area with a smooth, continuous curve spanning 90 degrees from the flexible plate to the top and bottom blocks, polished and substantially free from stress risers, said bottom block being secured to a pedestal base, and said top block being bolted to a bearing-supporting yoke.

2. The bearing spring plate pedestal of claim 1 wherein the flexible plate and top and bottom blocks are made from a continuous forging.

3. The bearing spring plate pedestal of claim 2 wherein the forging is alloy steel.

4. The bearing spring plate pedestal of claim 3 wherein the forging is heat treated.

5. The bearing spring plate pedestal of claim 1 wherein the top mounting block has access holes extending entirely through the mounting block, whereby a torque wrench can be extended to reach bolts extending through the bottom mounting block.

6. The bearing spring plate pedestal of claim 1 including epoxy Between said bottom block and said pedestal base.

7. The bearing spring plate pedestal of claim 1 including a tapered shim between the top mounting block and the bearing-supporting yoke.

* * * * *

UNITED STATES PATENT AND TRADEMARK OFFICE
CERTIFICATE OF CORRECTION

PATENT NO. : 6,712,516 B1
DATED : March 30, 2004
INVENTOR(S) : Melbourne F. Giberson It is certified that error appears in the above-identified patent and that said Letters Patent is hereby corrected as shown below:

Column 2,
Line 47, replace "1/4the"" with -- 1/16th --
Line 53, replace "block A" with -- block. A --

Column 5,
Line 49, replace "to dear" with -- to clear --

Column 6,
Line 43, replace "block The" with -- block. The --
Lines 54-55, replace "thick The" with -- thick. The --

Column 7,
Line 23, Replace "property" with -- properly --

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,712,516 B1  Page 1 of 1
DATED : March 30, 2004
INVENTOR(S) : Melbourne F. Giberson It is certified that error appears in the above-identified patent and that said Letters Patent is hereby corrected as shown below:

Column 8,
Line 25, replace "epoxy Between" with -- epoxy between --

Signed and Sealed this

Fourteenth Day of September, 2004

JON W. DUDAS
*Director of the United States Patent and Trademark Office*